US010283739B2

(12) United States Patent
Taniguchi (10) Patent No.: US 10,283,739 B2
(45) Date of Patent: May 7, 2019

(54) PACKAGING MATERIAL FOR ELECTRICAL STORAGE DEVICES, ELECTRICAL STORAGE DEVICE, AND METHOD FOR PRODUCING EMBOSSED PACKAGING MATERIAL (71) Applicant: TOPPAN PRINTING CO., LTD., Tokyo (JP)

(72) Inventor: Tomoaki Taniguchi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 226 days.

(21) Appl. No.: 15/286,375

(22) Filed: Oct. 5, 2016

(65) Prior Publication Data
US 2017/0025647 A1  Jan. 26, 2017

Related U.S. Application Data (63) Continuation of application No. PCT/JP2015/061008, filed on Apr. 8, 2015.

(30) Foreign Application Priority Data

Apr. 9, 2014 (JP) .................................. 2014-080363

(51) Int. Cl.
*H01M 2/00* (2006.01)
*H01M 2/02* (2006.01)
(Continued)

(52) U.S. Cl.
CPC .......... *H01M 2/0287* (2013.01); *H01M 2/02* (2013.01); *H01M 2/028* (2013.01);
(Continued)

(58) Field of Classification Search
CPC ...... H01M 2/0287; H01M 2/02; H01M 2/028; H01M 2/0285; H01M 2/06;
(Continued)

(56) References Cited

U.S. PATENT DOCUMENTS 7,285,334 B1  10/2007  Yamashita et al.
2002/0157242 A1  10/2002  Fukuda et al.
(Continued)

FOREIGN PATENT DOCUMENTS

JP  2003-288866 A  10/2003
JP  3567230 B2  9/2004
(Continued)

OTHER PUBLICATIONS

European Search Report dated Aug. 29, 2017 from related EP Application No. 15775984.6. (7 pages).
(Continued)

*Primary Examiner* — Raymond Alejandro
(74) *Attorney, Agent, or Firm* — Foley & Lardner LLP (57) ABSTRACT A packaging material for electrical storage devices which includes a base layer, a metal foil layer arranged on the base layer, and a sealant layer arranged on the metal foil layer. In the packaging material for electrical storage devices, the base layer includes at least one of a stretched polyester resin and a stretched polyamide resin, and the metal foil layer is an aluminum foil containing iron in the range of about 0.5 mass % or more to about 5.0 mass % or less. The packaging material has a tensile elongation of about 50% or more both the MD and TD directions of the base layer.

6 Claims, 6 Drawing Sheets (51) Int. Cl.
  *H01M 2/06* (2006.01)
  *H01M 10/0525* (2010.01)
  *H01M 10/058* (2010.01)

(52) U.S. Cl.
  CPC .......... *H01M 2/0285* (2013.01); *H01M 2/06* (2013.01); *H01M 10/058* (2013.01); *H01M 10/0525* (2013.01); *H01M 2002/0297* (2013.01); *Y02E 60/13* (2013.01)

(58) Field of Classification Search
  CPC .......... H01M 10/0525; H01M 10/058; H01M 2002/0297; Y02E 60/13
  See application file for complete search history.

(56) References Cited

U.S. PATENT DOCUMENTS

| | | |
|---|---|---|
| 2010/0330238 A1 | 12/2010 | Wintermantel et al. |
| 2014/0072864 A1 | 3/2014 | Suzuta et al. |
| 2015/0005049 A1 | 1/2015 | Guyer et al. |

FOREIGN PATENT DOCUMENTS

| | | | | |
|---|---|---|---|---|
| JP | 2004-296174 | A | | 10/2004 |
| JP | 2005-056729 | A | | 3/2005 |
| JP | 2006-066113 | A | | 3/2006 |
| JP | 2006-236857 | A | | 9/2006 |
| JP | 2008-257922 | A | | 10/2008 |
| JP | 2011-512433 | A | | 4/2011 |
| JP | 2012-014998 | A | | 1/2012 |
| JP | 2012-033393 | A | | 2/2012 |
| JP | 2012-059379 | A | | 3/2012 |
| JP | 2013-154389 | A | | 8/2013 |
| JP | 2013-174010 | | * | 9/2013 ............ C22C 21/00 |
| JP | 2013-174010 | A | | 9/2013 |
| JP | 2013-235763 | | * | 11/2013 ............ H01M 2/02 |
| JP | 2014-026778 | A | | 2/2014 |
| KR | 10-0645607 | | | 11/2006 |
| TW | 592959 | B | | 6/2004 |
| TW | 2011-29474 | A | | 9/2011 |
| TW | 2012-51177 | A | | 12/2012 |

OTHER PUBLICATIONS

International Search Report issued in International Patent Application. No. PCT/JP2015/061008 dated May 19, 2015.
Office Action issued in corresponding KR patent application No. 10-2016-7029218 dated Sep. 11, 2017.
European Office Action dated Apr. 24, 2018 in corresponding application No. 15775984.6.
Taiwanese Office Action dated Oct. 25, 2018 in corresponding application No. 104111237.
Chinese Office Action dated Jan. 16, 2019 in corresponding application No. 201580018456.3.
Japanese Office Action dated Feb. 19, 2019 in corresponding application No. 2016-512761.

* cited by examiner

PACKAGING MATERIAL FOR ELECTRICAL STORAGE DEVICES, ELECTRICAL STORAGE DEVICE, AND METHOD FOR PRODUCING EMBOSSED PACKAGING MATERIAL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2015/061008 filed on Apr. 8, 2015, which is based upon and claims the benefit of priority of Japanese Patent Application No. 2014-080363, filed on Apr. 9, 2014, the entireties of which are hereby incorporated by reference.

TECHNICAL FIELD

The present invention relates to a packaging material for electrical storage devices, an electrical storage device, and a method for producing an embossed packaging material.

BACKGROUND

As electrical storage devices, for example, secondary batteries such as lithium ion batteries, nickel hydrogen batteries, or lead storage batteries, or electric double layer capacitors are known. The further downsizing of electrical storage devices is sought because of the downsizing of mobile devices, limitations of installation spaces, etc., and lithium ion batteries in which the energy density is high have been receiving attention. Such a lithium ion battery uses a configuration which covers the entirety of the battery with a packaging material including an aluminum foil layer to prevent moisture from entering through the surface, and is referred to as an aluminum laminate lithium ion battery. The aluminum laminate lithium ion battery, for example, forms a recess on a part of the packaging material by cold forming, accommodates the battery elements (a positive electrode, a separator, a negative electrode, an electrolytic solution, etc.) in the recess, and folds the remaining portions of the packaging material and seals the edge portions by heat-sealing, and an embossed lithium ion battery (hereinafter, referred to as "single-sided formed battery") is formed thereby.

The energy density of the lithium ion battery increases as the depth of the recess formed by cold forming increases. However, pinholes or breaking readily occurs during forming in the packaging material as the formed recess becomes deeper, leading to more deterioration in formability. Therefore, a stretched polyamide film or the like has been used for the base layer of the packaging material to protect a metal foil such as aluminum foil. As an example, PTL 1 proposes use of a film for the base layer, wherein the film's tensile strengths in four directions, 0°, 45°, 90° and 135°, until the occurrence of breakage in a tensile test are 150 N/mm$^2$, and the elongations in the four directions are 80% or more.

CITATION LIST

Patent Literature

PTL 1: JP-B-3567230

SUMMARY OF THE INVENTION

Technical Problem

On the other hand, recently, for the purpose of increasing the energy density, a lithium ion battery (hereinafter, referred to as the "double-sided formed battery"), where recesses are formed on both surfaces to be bonded of the packaging material, has been produced which can accommodate more battery elements, but there is a problem that this kind of double-sided formed battery has alignment difficulties when the surfaces of the packaging material are bonded. The formation of a deeper recess has been sought to obtain the same energy density as a double-sided formed battery in a single-sided formed battery. However, with the battery case packaging material disclosed in PTL 1, there have been cases when the formability of is not always sufficient for the formation of a deeper recess.

The object of the present invention, in consideration of the aforementioned circumstances, is to provide a packaging material for electrical storage devices in which a good formability can be obtained when producing an electrical storage device having a deep recess in the packaging material, and a method for producing an embossed packaging material.

Solution to Problem

In order to improve on or even solve the aforementioned problem, in the present invention, a packaging material for electrical storage devices is characterized in that the packaging material includes a base layer, a metal foil layer arranged on the base layer, and a sealant layer arranged on the metal foil layer, wherein: the base layer includes at least one of a stretched polyester resin layer and a stretched polyamide resin layer; the metal foil layer is an aluminum foil containing iron in a range of about 0.5 mass % or more to about 5.0 mass % or less; and the packaging material has a tensile elongation of about 50% or more in both an MD direction and a TD direction of the base layer.

With the aforementioned packaging material, the base layer protects the metal foil layer during forming to inhibit breakage of the metal foil layer, by the base layer including at least one of the stretched polyester resin layer and the stretched polyamide resin layer. Further, the metal foil layer being an aluminum foil which contains about 0.5 mass % or more to about 5.0 mass % or less of iron can improve the extensibility of the metal foil layer and can inhibit breakage during forming. Furthermore, by the tensile elongation of the aforementioned packaging material being about 50% or more in both the MD and TD directions of the base layer, the packaging material becomes tough with respect to the tensile stress during forming, and breakage can be better inhibited.

It is preferable that the packaging material further includes a first adhesive layer arranged on the base layer, the metal foil layer is arranged on the base layer via the first adhesive layer; and the first adhesive layer includes an aromatic polyurethane adhesive layer. In this case, an improved or even superior formability of the packaging material can be obtained by the aforementioned first adhesive layer including an aromatic polyurethane adhesive layer.

It is preferable that the packaging material further comprises a second adhesive layer arranged on the metal foil layer; the sealant layer is arranged on the metal foil layer via the second adhesive layer; the base layer has a thickness in a range of 20 μm or more to 50 μm or less; the metal foil layer has a thickness in a range of 30 μm or more to 60 μm or less; and a total thickness of the second adhesive layer and the sealant layer is in a range of 25 μm or more to 90 μm or less. By the thickness of the base layer being 20 μm or more and the thickness of the metal foil layer being 30 μm or more, breakage is unlikely to occur regardless of the stress due to forming, and thus the formability of the packaging material is further improved. Further, by the total of the thicknesses of the second adhesive layer and the sealant layer being 90 μm or less, the thickness of the packaging material can be prevented from becoming large without impairing the formability.

It is preferable that at least one of the base layer side surface and the sealant layer side surface of the packaging material has a coefficient of static friction of 0.1 or more; and it is preferable that the base layer side surface and the sealant layer side surface each have a coefficient of static friction of 0.4 or less. By the coefficient of static friction of the base layer side surface and the sealant layer side surface being 0.4 or less, the packaging material easily flows to the recess during forming, and the elongation of the packaging material is better inhibited to thereby inhibit breakage. Further, by the coefficient of static friction of the base layer side surface and/or the sealant layer side surface being 0.1 or more, the pressing of a portion (lid portion or blank portion) other than the recess during forming becomes easier, and wrinkling during forming can be further inhibited. Further, it is preferable that a difference ($\mu_S - \mu_D$) between a coefficient of static friction $\mu_S$ and a coefficient of dynamic friction $\mu_D$ of the base layer side surface and the sealant layer side surface is 0.1 or less. By the difference ($\mu_S - \mu_D$) between the coefficient of static friction $\mu_S$ and the coefficient of dynamic friction $\mu_D$ being 0.1 or less, the sliding property is balanced between the recess and the flange-pressing part of the packaging material during forming, and the component materials of the packaging material flow more easily to the recess. As a result, the recess does not become excessively thin during forming, and breakage likely to be further inhibited.

The present invention may also be regarded as an electrical storage device obtained using the aforementioned packaging material for electrical storage devices.

Further, the present invention may also be regarded as a method for producing an embossed packaging material. A method for producing the embossed packaging material includes steps of: preparing a forming apparatus including a punching die and a die having an opening corresponding to the punching die; arranging the packaging material for electrical storage devices between the punching die and the die so that the packaging material for electrical storage devices covers the opening; and pushing the punching die into the opening to form a recess in the packaging material for electrical storage devices. The production method is characterized in that a punch radius Rp of the punching die and a die radius Rd of the die are each in a range of 1 mm or more to 5 mm or less; a corner radius Rcp of the punching die is in a range of 1 mm or more to 5 mm or less; and a clearance that is a smallest spacing between the punching die and the die is 1 to 1.5 times the thickness of the packaging material when the punching die is pushed into the opening of the die.

By the punch radius Rp and the die radius Rd being 1 mm or more, the packaging material flows into the clearance without sticking during forming and breakage can be better inhibited during forming, and, by the Rp and Rd being 5 mm or less, wrinkling due to the thickening of the film of the packaging material during forming can be better inhibited. Further, by the corner radius Rcp of the punching die being 1 mm or more, partial increase of the film thickness due to the flow of the packaging material during forming can be better avoided, sticking in the clearance can be better inhibited, and breakage can be better inhibited during forming. By the Rcp being 5 mm or less, the collapse of the corner shape of the recess can be better inhibited when arranging the battery elements and pressure heat-sealing the edge. Further, by the clearance being 1 or more times the thickness of the packaging material, sticking in the clearance can be better inhibited.

The electrical storage device may be produced by arranging electrical storage device elements in the recess of the embossed packaging material obtained by the aforementioned production method; folding and overlapping the embossed packaging material so as to cover the recess; and heat-sealing overlapped portions of the embossed packaging material.

Advantageous Effects of the Invention

The packaging material for electrical storage devices of the present invention can also obtain good formability in producing an electrical storage device having a deep recess in the packaging material.

BRIEF DESCRIPTION OF THE DRAWINGS

FIGS. 2A and 2B are a set of diagrams illustrating an embossed packaging material produced by the production method according to the first embodiment of the present invention, wherein

FIGS. 4A, 4B, and 4C are a set of schematic longitudinal sectional views along line IV-IV of FIG. 3 illustrating a process which uses the forming apparatus shown in FIG. 3 to form the packaging material, wherein

FIGS. 6A, 6B, and 6C are a set of perspective views illustrating a process for using the embossed packaging material according to the first embodiment of the present invention to produce a single-sided formed battery, wherein

DESCRIPTION OF REPRESENTATIVE EMBODIMENTS

Hereinafter, an embodiment or embodiments of the present invention will be described in detail. Note that, the present invention should not be limited to the following embodiment(s), which are simply representative of the present invention.

(Packaging Material 10 for Electrical Storage Device)

Figure 1:
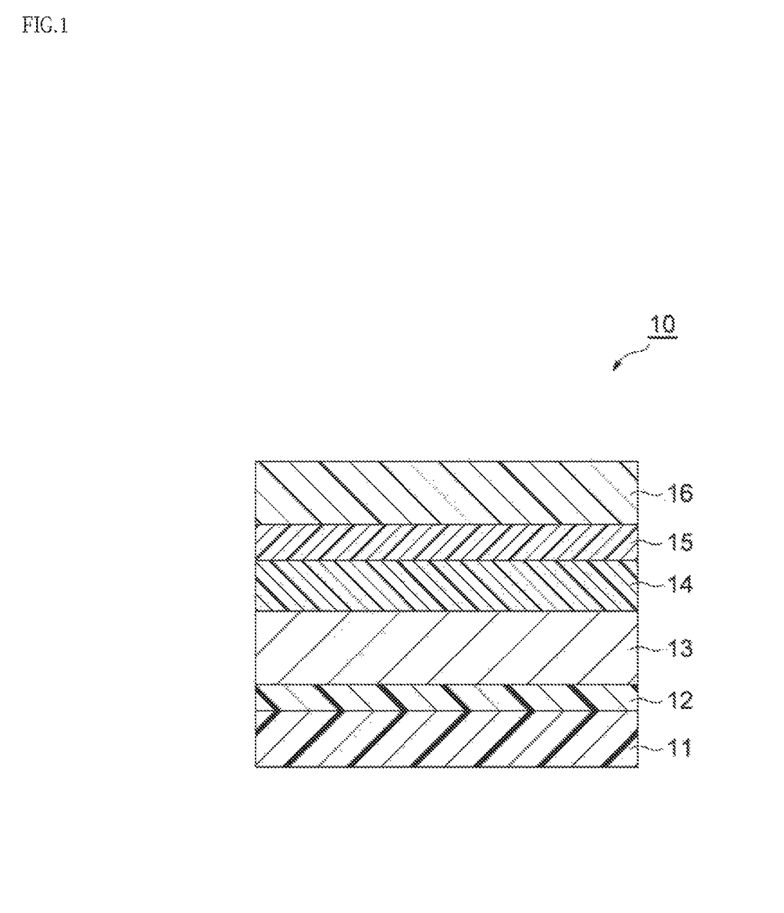
FIG. 1 is a schematic sectional view of a packaging material for electrical storage device according to a first embodiment of the present invention.

First, the packaging material 10 for electrical storage devices (hereinafter, simply referred to as the "the packaging material 10") according to the first embodiment will be described. The packaging material 10 covers the battery elements such as a positive electrode, a separator, a negative electrode and an electrolytic solution to thereby prevent moisture from entering into the battery, and to thereby prevent substances (e.g., hydrofluoric acid and the like generated by the entry of moisture) generated therein from flowing outside. This kind of packaging material 10, as shown in FIG. 1, is provided, as a basic configuration, with a base layer 11, a metal foil layer 13 that is arranged on the base layer 11, and a sealant layer 16 that is arranged on the metal foil layer 13. An adhesive layer 12 may be arranged between the base layer 11 and the metal foil layer 13 in the packaging material 10, i.e., the adhesive layer 12 may be further provided arranged on the base layer 11, and the metal foil layer 13 may be arranged on the base layer 11 via the adhesive layer 12.

Further, a corrosion prevention treatment layer 14 and/or an adhesive layer 15 may be arranged between the metal foil layer 13 and the sealant layer 16 in the packaging material 10. Namely, the corrosion prevention treatment layer 14 and/or the adhesive layer 15 may be further provided arranged on the metal foil layer 13, and the sealant layer 16 may be arranged on the metal foil layer 13 via the corrosion prevention treatment layer 14 and/or the adhesive layer 15. In the packaging material 10, the base layer 11 may be the outermost layer and the sealant layer 16 may be the innermost layer. Namely, in the packaging material 10, the base layer 11 may face outwards and the sealant layer 16 may face inwards as a container for electrical storage device so as to accommodate the electrical storage device.

The tensile elongation in both the MD direction and the TD direction of the packaging material 10 according to the embodiment is about 50% or more, and is preferably 60% or more. By the tensile elongation of the packaging material 10 being about 50% or more, the protection effect to the metal foil layer 13 of the base layer 11 can increase and can inhibit breakage during forming. The tensile elongation in both the MD and TD directions of the packaging material 10 may be 200% or less, and may be 150% or less.

The MD direction is an abbreviation for "Machine Direction", and indicates the flow direction in producing the base layer 11. Further, the TD direction is an abbreviation for "Transverse Direction", and is the direction perpendicular to the MD direction in the plane of the base layer 11. The tensile elongation of the packaging material 10 is calculated in accordance with the method of tensile test described in JIS Z 2241, as the percentage of the increments of the original gauge length measured under conditions of a tension speed of 25 mm/min, a temperature of 23° C., and a 50% RH, in relation to the original gauge length.

Further, the coefficient of static friction of at least one of (preferably, both of) the base layer side surface and the sealant layer side surface of the packaging material 10 is preferably 0.1 or more, and more preferably 0.15 or more. By the coefficient of static friction of the base layer side surface and/or the sealant layer side surface of the packaging material 10 being 0.1 or more, the pressing of the portion (lid portion or the blank portion) other than the recess of the packaging material 10 during forming is effected and wrinkling can be better inhibited. The coefficient of static friction of the base layer side surface and the sealant layer side surface of the packaging material 10 is preferably 0.4 or less, and more preferably 0.3 or less. By the coefficient of static friction of the base layer side surface and the sealant layer side surface of the packaging material 10 being 0.4 or less, the flow amount to the formed area (the recess 22) of the packaging material 10 increases, and a better formability can be obtained. Furthermore, when the coefficient of static friction is $\mu_S$ and the coefficient of dynamic friction is $\mu_D$, the difference ($\mu_S-\mu_D$) between the coefficient of static friction $\mu_S$ and the coefficient of dynamic friction $\mu_D$ of the base layer side surface and the sealant layer side surface of the packaging material 10 is preferably 0.1 or less, and more preferably 0.05 or less. By the difference ($\mu_S-\mu_D$) between the coefficient of static friction and the coefficient of dynamic friction being 0.1 or less, a balance is achieved during forming in the sliding properties between the recess and the flange-pressing part of the packaging material 10, and the component materials of the packaging material 10 easily flow into the recess. As a result, the recess is unlikely to be too thin during forming, and breakage is likely to be further inhibited. An example of a method for reducing the coefficient of static friction of the base layer side surface and the sealant layer side surface, or, a method for reducing the difference between the coefficient of static friction and the coefficient of dynamic friction includes: dissolving a lubricant, such as a fatty acid amide, in a solvent; coating the solution on the base layer side surface and the sealant layer side surface by a method such as gravure coating, reverse coating, roll coating, or bar coating; and drying the coating to obtain a lubricant layer. The coefficient of static friction value can be controlled by the amount of lubricant to be coated.

The aforementioned coefficient of static friction and the coefficient of dynamic friction are measured in accordance with the friction testing method which uses the horizontal plane method described in JIS P 8147. In this case, the coefficient of static friction and the coefficient of dynamic friction are measured between the packaging material and a metal comprised of the same material and having the same surface state as the forming die.

Next, each layer configuring the packaging material 10 will be more specifically described.

[Base Layer 11]

The base layer 11 serves to impart heat resistance to the packaging material 10 when producing the electrical storage device in a pressure heat-sealing process which will be described later, and inhibits the occurrence of pinholes which can occur during processing or distribution. The base layer 11 is formed including at least one of the stretched polyester resin layer and the stretched polyamide resin layer. By the base layer 11 including at least one of the stretched polyester resin layer and the stretched polyamide resin layer, the metal foil layer 13 is protected during forming, and breakage can be better inhibited. Further, from the viewpoint of increasing the tensile elongation of the packaging material 10, the stretched polyester resin layer is preferably a biaxially stretched polyester resin layer, and the stretched polyamide resin layer is preferably a biaxially stretched polyamide resin layer. Furthermore, the stretched polyester resin layer is preferably a biaxially stretched polyethylene terephthalate (PET) film and the stretched polyamide resin layer is preferably a biaxially stretched nylon (ONy) film, because these films have high piercing strength or impact strength. The base layer 11 may be formed including both of the stretched polyester resin layer and the stretched polyamide resin layer.

The thickness of the base layer 11 is for example, preferably in the range of 20 µm to 50 µm, and more preferably 25 µm to 50 µm, and even more preferably 30 µm to 40 µm. By the thickness of the base layer 11 being 20 µm or more, the protection effect of the metal foil layer 13 improves, and better formability can be obtained. By the thickness of the base layer 11 being 50 µm or less, the warpage after the forming process can be reduced. Note that, the thickness of the base layer 11 is the thickness after lamination, and the same is true for the adhesive layer 12, the metal foil layer 13, the corrosion prevention treatment layer 14, the adhesive layer 15 and the sealant layer 16 to be described hereinafter. In the present specification, the thickness of at least the base layer 11, the metal foil layer 13, the corrosion prevention treatment layer 14 and the sealant layer 16 before lamination is the same as the thickness after lamination.

[Adhesive Layer 12]

The adhesive layer 12 serves to bond the base layer 11 with the metal foil layer 13. The adhesive forming the adhesive layer 12 is preferably a two-liquid curing type polyurethane adhesive containing a base resin such as polyester polyol, polyether polyol or acrylic polyol, and a curing agent such as aromatic polyisocyanate. More preferably, the adhesive layer 12 is a two-liquid curing type aromatic polyester urethane adhesive containing a base resin of a polyester polyol, and a curing agent of aromatic polyisocyanate, from the viewpoint of making the tensile elongation of the packaging material 10 large. After coating the aforementioned urethane adhesive, the reaction of the hydroxyl group of the base resin and the isocyanate group of the curing agent is promoted, for example, by aging at 40° C. for 4 days or more, for firm adhesion of the base layer 11 with the metal foil layer 13.

The thickness of the adhesive layer 12 is preferably in the range of 1 to 10 µm, and more preferably 3 to 7 µm, from the viewpoints of the adhesiveness, conformability, the processability, etc.

[Metal Foil Layer 13]

The metal foil layer 13 is, for example, made up of aluminum foil, from the viewpoints of a moisture-proof property, processability such as extensibility, and cost. The aluminum foil preferably contains iron, because iron has good pinhole resistance and extensibility during forming. The iron content in the aluminum foil is preferably in the range of about 0.5 to about 5.0 mass %, and more preferably 0.7 to 2.0 mass %. By the iron content being about 0.5 mass % or more, good pinhole resistance and extensibility can be obtained in the packaging material 10. Further, by the iron content being about 5.0 mass % or less, good flexibility can be obtained in the packaging material 10.

The thickness of the metal foil layer 13 is preferably in the range of 30 to 60 µm, and more preferably 40 to 60 µm from the viewpoints of barrier properties, pinhole resistance, and forming processability. By the thickness of the metal foil layer 13 being 30 µm or more, breakage is unlikely to occur when stress is applied during forming. By the thickness of the metal foil layer 13 being 60 µm or less, the increase in mass of the packaging material can be reduced, and the weight energy density of the electrical storage device is prevented from being lowered.

[Corrosion Prevention Treatment Layer 14]

The corrosion prevention treatment layer 14 serves to inhibit the corrosion of the metal foil 13 due to hydrofluoric acid which is generated by the electrolytic solution or the reaction between the electrolytic solution and moisture, and serves to increase the adhesive force between the metal foil layer 13 and the adhesive layer 15.

The corrosion prevention treatment layer 14 is preferably a coating film formed from a coating type or an immersion type acid-resistant corrosion prevention treatment agent. This kind of coating film has good corrosion prevention effect against acids, for the metal foil layer 13. Further, the adhesive force between the metal foil layer 13 and the adhesive layer 15 becomes stronger by the anchor effect, thus, good resistance is obtained against electrical storage device elements such as an electrolytic solution. Further, the corrosion prevention treatment layer 14 may be added between the adhesive layer 12 and the metal foil layer 13 in accordance with the required function.

The coating film of the corrosion prevention treatment agent is formed through, for example, a ceria sol treatment that uses a corrosion prevention treatment agent composed of cerium oxide, phosphoric acid and thermosetting resins, a chromate treatment that uses a corrosion prevention treatment agent composed of chromate, phosphate, fluoride and thermosetting resins, and the like. Note that, the corrosion prevention treatment layer 14 is not limited to the aforementioned coating film as long as the corrosion prevention treatment layer 14 provides a coating film which imparts sufficient corrosion resistance to the metal foil layer 13. The corrosion prevention treatment layer 13 may be a coating film formed, for example, through phosphate treatment, boehmite treatment, or the like.

The corrosion prevention treatment layer 14 may have a single-layer structure or a multilayer structure. Further, an additive such as a silane coupling agent may be added to the corrosion prevention treatment layer 14. The thickness of the corrosion prevention treatment layer 14 is preferably in the range of 10 nm to 5 µm, and more preferably 20 to 500 nm, in view of the corrosion protective function and the function as an anchor.

[Adhesive Layer 15]

The adhesive layer 15 serves to bond the metal foil layer 13 on which the second corrosion protective layer 14 is formed, with the sealant layer 16. The packaging material 10 is broadly categorized into thermal lamination configurations and dry lamination configurations according to the adhesive component forming the adhesive layer 15.

The adhesive component for forming the adhesive layer 15 in the thermal lamination configuration is preferably an acid-modified polyolefin resin or an epoxy-modified polyolefin resin obtained by graft-modifying a polyolefin resin with an acid or epoxy compound. As a polar group is introduced to a part of a non-polar polyolefin resin, the acid-modified polyolefin resin can adhere tightly to both the sealant layer 16 when it is made of a non-polar polyolefin resin film, and the corrosion prevention treatment layer 14 having polarity in many cases. Further, by using the acid-modified polyolefin resin, the resistance of the packaging material 10 to electrical storage device elements such as the electrolytic solution improves, and if hydrofluoric acid is generated within the battery, reduction in the adhesion force due to deterioration of the adhesive layer 15 is easily prevented.

The polyolefin resin used when producing the acid-modified polyolefin resin includes low-, medium-, or high-density polyethylene; an ethylene-α olefin copolymer; polypropylene; a propylene-α olefin copolymer; or the like. In the case of a copolymer, the polyolefin resin may be a block copolymer or may be a random copolymer.

The method for acid-modification of the polyolefin resin includes a method for graft-modifying with an acid, or a method for copolymerizing a monomer having an acid, or the like. As the acid modifying the polyolefin resin, carboxylic acid, acid anhydride, or the like can be mentioned, and the aforementioned acid is preferably maleic anhydride. The adhesive layer 15 preferably contains maleic anhydride-modified polyolefin resin, and more preferably contains maleic anhydride-modified polypropylene. By the adhesive layer 15 containing a maleic anhydride-modified polyolefin resin, the adhesive force between the sealant layer 16 and the metal foil layer 13 is easy to maintain if the electrolytic solution infiltrates.

The rate of modification of the polyolefin resin with an acid (e.g., the mass of the portion derived from maleic anhydride relative to the total mass of maleic anhydride-modified polypropylene) is preferably in the range of 0.1 to 20 mass %, and more preferably 0.3 to 5 mass %.

The adhesive layer 15 having the thermal lamination configuration preferably comprises a styrene elastomer or an olefin elastomer. This can readily prevent blushing due to the occurrence of cracks in the adhesive layer 15 during cold forming. Thus, it is expected that the adhesion increases due to improvement of wettability, and formability is improved due to reduction of anisotropy. These elastomers are preferably dispersed at the order of nanometers (nanometer size) in a polyolefin resin or are preferably compatible therewith.

Polyolefin resins may be used singly or in combination of two or more to configure the adhesive layer 15.

The adhesive layer 15 having the thermal-lamination configuration can be formed by extruding the aforementioned adhesive component with an extrusion apparatus. The melt flow rate (MFR) of the adhesive component of the adhesive layer 15 having the thermal-lamination configuration is preferably 4 to 30 g/10 minutes under conditions of 230° C. and a load of 2.16 kgf. The thickness of the adhesive layer 15 having the thermal-lamination configuration is preferably in the range of 5 to 40 μm.

As the adhesive component of the adhesive layer 15 in the dry-lamination configuration, for example, a two-liquid curing type polyurethane adhesive similar to the ones mentioned for the adhesive layer 12 can be mentioned. The adhesive layer 15 having the dry-lamination configuration has a coupling portion, such as an ester group or a urethane group, having high hydrolyzability, thus, using the adhesive layer 15 having the thermal-lamination configuration is preferable for uses demanding higher reliability.

[Sealant Layer 16]

The sealant layer 16 serves to impart sealing properties to the packaging material 10 by heat-sealing. The sealant layer 16 includes a resin film made of a polyolefin resin or an acid-modified polyolefin resin obtained by graft-modifying an acid such as maleic anhydride. As the acid-modified polyolefin resin, the same acids can be used as those mentioned for the adhesive layer 15.

The sealant layer 16 may be a single-layer film or a multilayer film, and may be selected in accordance with the function that is required. For example, in view of imparting moisture-proof properties, a multilayer film provided with the aforementioned acid-modified polyolefin resin layer and a resin layer such as of ethylene-cyclic olefin copolymer or polymethylpentene can be used. Further, the sealant layer 16 may contain various additives such as a flame retardant, a slip agent, an anti-blocking agent, an oxidation inhibitor, a photostabilizer, and a tackifier.

The thickness of the sealant layer 16 is preferably in the range of 20 to 85 μm, and more preferably 30 to 40 μm. The total thickness of the adhesive layer 15 and the sealant layer 16 is preferably in the range of 25 to 90 μm, and more preferably 30 to 60 μm. By the total thickness of the adhesive layer 15 and the sealant layer 16 being 25 μm or more, insulation can be easily maintained between an electrical storage device element or a tab lead of a current extraction portion and the metal foil layer 13. By the total thickness of the adhesive layer 15 and the sealant layer 16 being 90 μm or less, the increase in the film thickness of the packaging material 10 can be minimized without impairing formability.

(Production Method of the Packaging Material 10)

Next, a production method of the packaging material 10 will be described. However, the production method of the packaging material 10 is not limited to the following method.

As the production method of the packaging material 10, a method having the following steps S11-S13 can be used.

Step S11: Step of forming the corrosion prevention treatment layer 14 on one surface of the metal foil layer 13.

Step S12: Step of forming the base layer 11 on the other surface of the metal foil layer 13 via the adhesive layer 12.

Step S13: Step of forming the sealant layer 16 on the corrosion prevention treatment layer 14 via the adhesive layer 15.

[Step S11]

The corrosion prevention treatment layer 14 is formed on one surface of the metal foil layer 13 by, for example, coating the corrosion prevention treatment agent on one surface of the metal foil layer 13, followed by drying. Examples of the corrosion prevention treatment agent include a corrosion prevention treatment agent for use in ceria sol treatment, a corrosion prevention treatment agent for use in chromate treatment, and the like. The method of coating the corrosion prevention treatment agent is not particularly limited, and examples thereof include gravure coating, reverse coating, roll coating, and bar coating.

[Step S12]

The base layer 11 is formed on the other surface of the metal foil layer 13 by, for example, being bonded thereto using an adhesive which forms the adhesive layer 12, through a method such as dry lamination.

The laminate may be aged (cured) in a range from room temperature to 100° C. after forming the base layer 11 to increase the adhesiveness between the base layer 11 and the metal foil layer 13. The duration of the aging is for example, typically 1 to 10 days.

[Step S13]

After step S12, the sealant layer 16 is formed via the adhesive layer 15 on the corrosion prevention treatment layer 14 side of the laminate in which the base layer 11, the adhesive layer 12, the metal foil layer 13 and the corrosion prevention treatment layer 14 are successively laminated in this order. The sealant layer 16 may be laminated by dry lamination or sandwich-lamination, etc., or may be laminated by being co-extruded together with the adhesive layer 15. The sealant layer 16, from the viewpoint of improving the adhesiveness, is preferably laminated by, for example, sandwich-lamination, or laminated by being co-extruded together with the adhesive layer 15, but more preferably laminated by sandwich-lamination.

The packaging material 10 can be obtained by the above-mentioned steps S11 to S13. The order of the steps of the preparation method of the packaging material 10 is not limited to executing the methods in the sequence steps S11 to S13. For example, step S11 may be performed after performing step S12.

(Production Method of the Embossed Packaging Material 20)

Figure 2A:
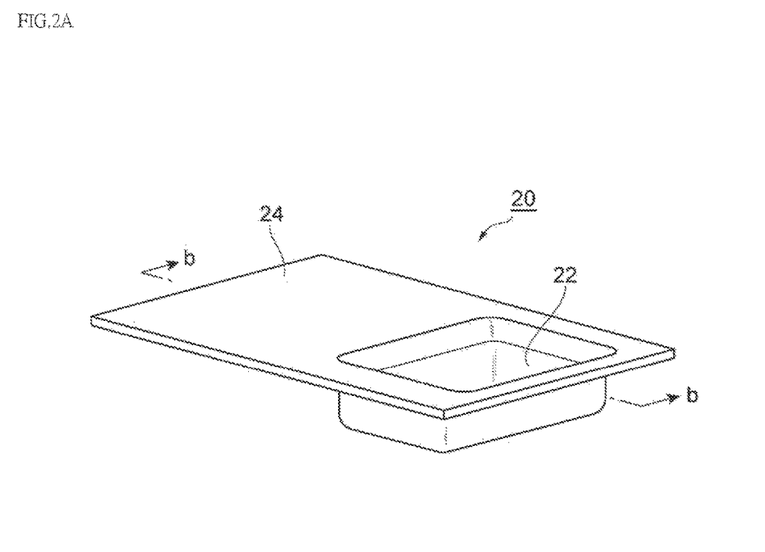
FIG. 2A is a perspective view thereof.
Figure 2B:
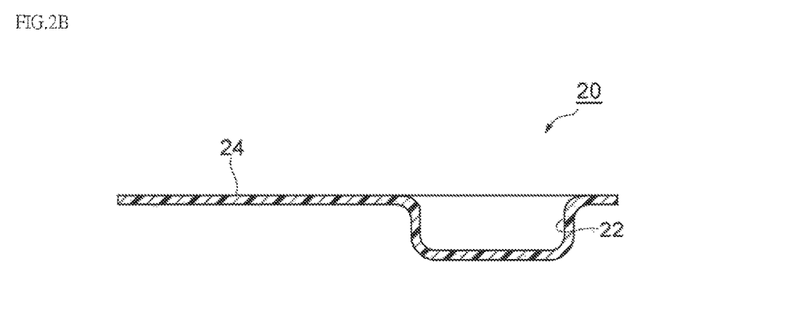
FIG. 2B is a longitudinal sectional view along line b-b of the embossed packaging material illustrated in FIG. 2A.
Figure 3:
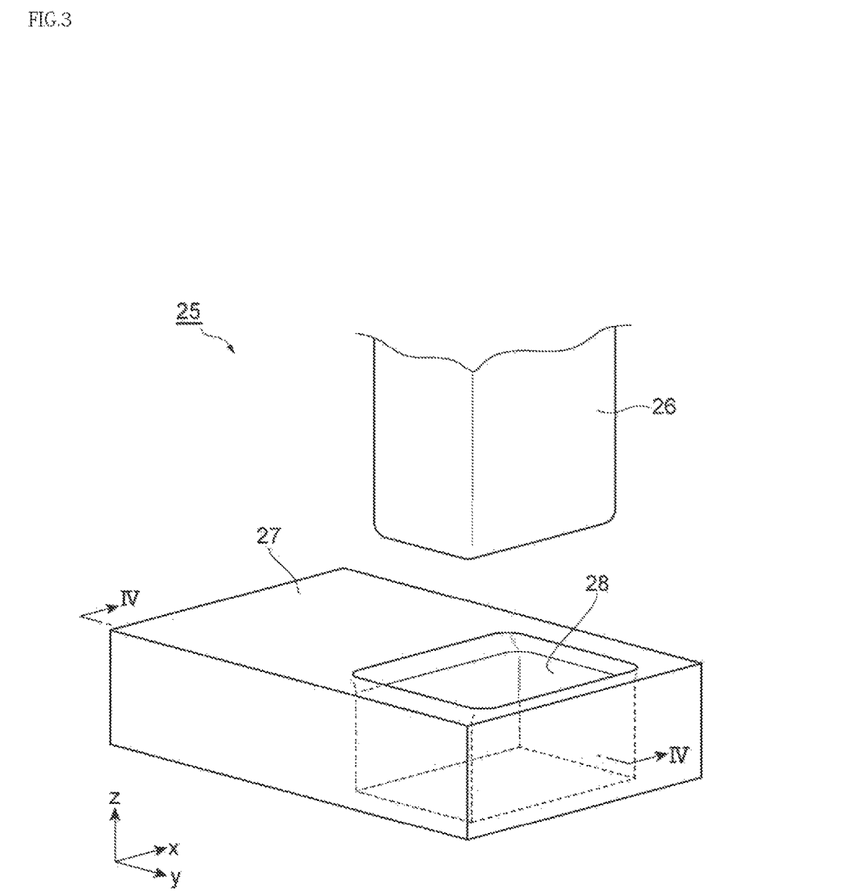
FIG. 3 is a perspective view of a forming apparatus used in the method for producing the embossed packaging material according to the first embodiment of the present invention.
Figure 4A:
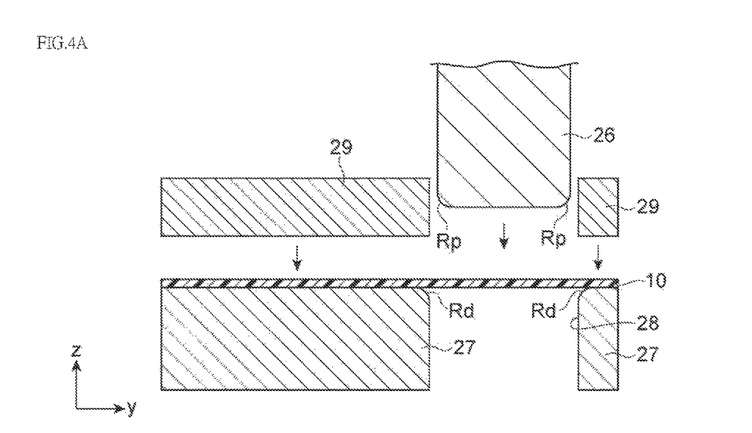
FIG. 4A is illustrates a state in which the packaging material is arranged on a die.
Figure 4B:
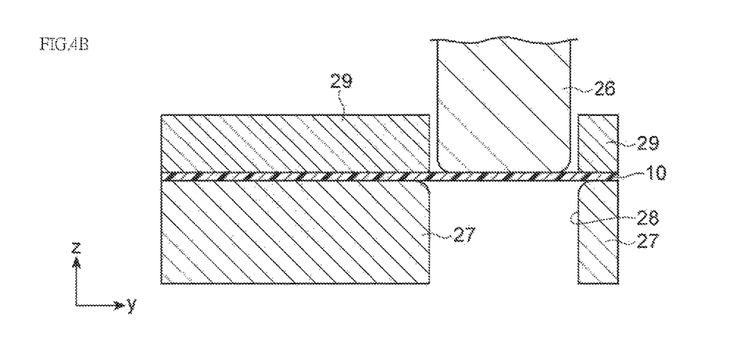
FIG. 4B illustrates a state in which the packaging material is fixed by a film presser.
Figure 4C:
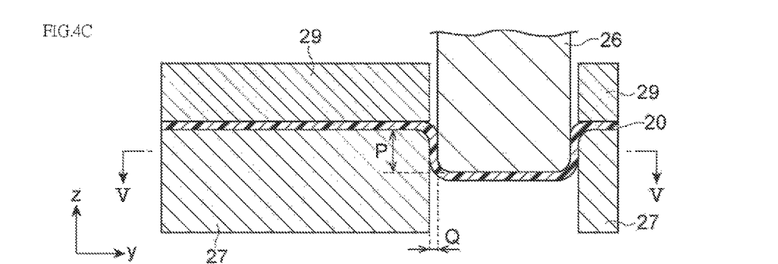
FIG. 4C illustrates a state in which the recess has been formed by pushing the punching die.
Figure 5:
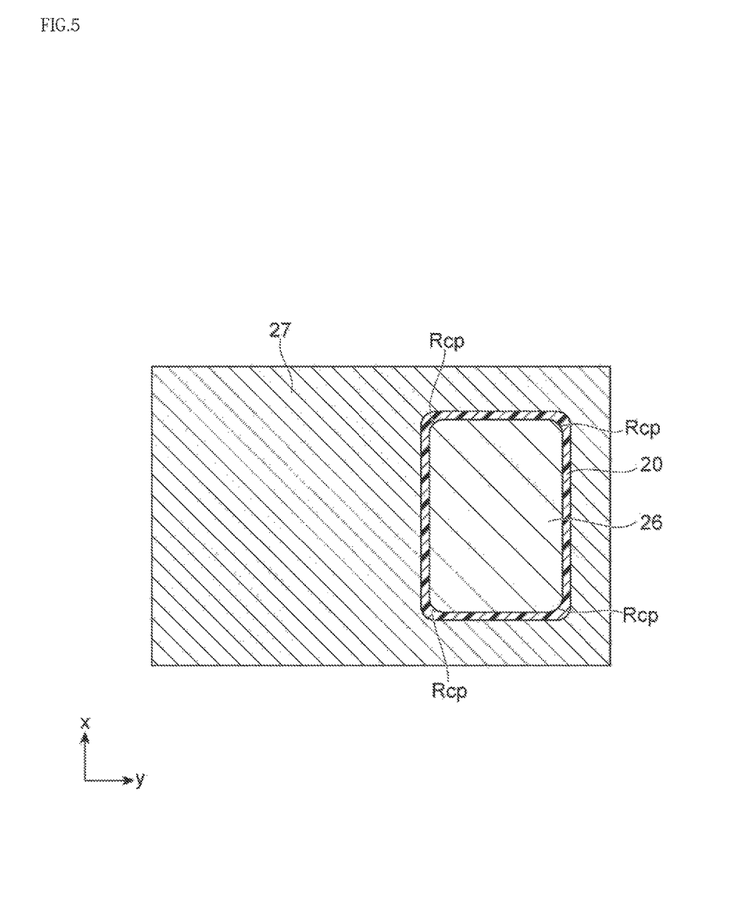
FIG. 5 is a schematic cross-sectional view along line V-V illustrating the forming apparatus and the like in the forming process illustrated in FIG. 4C.

Next, with reference to FIGS. 2A to 5, a method for producing an embossed packaging material 20 from the packaging material 10 will be described. FIGS. 2A and 2B are a set of diagrams showing the embossed packaging material 20 produced by a production method according to the embodiment. FIG. 3 is a perspective view of a forming apparatus 25 used in producing the embossed packaging material shown in FIGS. 2A and 2B. FIGS. 4A-4C show a schematic longitudinal sectional view of a step of forming the packaging material. FIG. 5 is a cross-sectional view of FIG. 4C. The embossed packaging material 20, as shown in FIGS. 2A and 2B, has a recess 22 for accommodating the battery elements on one side in the longitudinal direction, and has a planar lid portion 24 on the other side. The embossed packaging material 20 is folded so that the lid portion 24 covers the recess 22, when producing the electrical storage device described later.

This kind of embossed packaging material 20 can be produced from the packaging material 10 in the following steps S21-S23 using the forming apparatus 25 provided with a punching die 26 and a die 27 as shown in FIG. 3. The die 27 is formed with an opening 28 having an aperture of a size which is almost the same as the cross-sectional area of the punching die 26.

Step S21: Step of preparing a forming apparatus 25 provided with a punching die 26, and the die 27 having the opening 28 corresponding to the punching die 26.

Step S22: Step of arranging the packaging material 10 for electrical storage devices between the punching die 26 and the die 27 so that the packaging material 10 for electrical storage devices covers the opening 28.

Step S23: Step of pressing the punching die 26 into the opening 28 and forming the recess 22 in the packaging material 10 for electrical storage devices.

[Steps S21-S22]

The punching die 26 is arranged in the upper part of the opening 28 of the die 27 as shown in FIG. 3 and FIG. 4A. The packaging material 10 is arranged between the punching die 26 and the die 27 so as to cover opening 28. At least the corner portions of the bottom surface and the side surface of the punching die 26 are preferably rounded. The roundness of the corner portions of the bottom surface of the punching die 26 is represented by a punch radius Rp, that is a curvature the radius, when the aforementioned roundness is taken to be an arc (refer to FIG. 4A), and the roundness of the corner portions of the side surface is represented by a corner radius Rcp (refer to FIG. 5).

The die 27 has a rectangular parallel-piped shape, the upper surface of which has a size which is equal to or greater than the packaging material 10, and the shape in the xy plane of the opening 28 is approximately the same as the shape of the cross-section in the xy plane of the punching die 26. The die 27 preferably has the opening 28 (through hole) positioned being displaced to one side of the upper surface when the upper surface is divided at a halfway point along a line perpendicular to the long side (longitudinal direction), and more preferably has the opening 28 (through hole) positioned in either one of the halves of the upper surface divided in halves along a line perpendicular to the long side (refer to FIG. 3).

By the die 27 having an opening 28 in the aforementioned position, the embossed packaging material 20 in which the recess 22 is formed can be obtained. One side of the embossed packaging material 20 is folded so as to be able to produce the container for accommodating the electrical storage device in the aforementioned recess 22. The opening 28 preferably has a length of 100 mm or more on one side in the xy plane in FIG. 3. By the opening 28 being a shape of such a size, a more satisfactory formability can be obtained without receiving the effect of flow of the packaging material 10 into other adjacent corners when the packaging material 10 flows into the corners in the xy plane of FIG. 3 in the forming process.

Further, as shown in FIG. 4B, the packaging material 10 is fixed on the die 27 by a film presser 29. In other words, the packaging material 10 is held between the die 27 and the film presser 29. On the other hand, in the die 27, the corners portion formed by the opening 28 are preferably rounded The roundness of the corner portions of the yz plane of the opening 28 are respectively represented by the die radius Rd that is the curvature radius when the aforementioned roundness is taken to be an arc (refer to FIG. 4A and FIG. 5).

The punch radius Rp and the die radius Rd which are respectively the curvature radii of the corner portions of the punching die 26 and the die 27 sandwiching the packaging material 10 are each preferably in the range of not less than 1 mm to not more than 5 mm, and more preferably 2 mm to 4 mm. By the punch radius Rp and the die radius Rd each being 1 mm or more, the packaging material 10 can flow into a die clearance Q during forming without sticking. Further, by the punch radius Rp and the die radius Rd each being 5 mm or less, wrinkling due to the increase in the film thickness can be better inhibited when the packaging material 10 flows into the die clearance Q.

Further, each corner radii Rcp of the punching die 26 is preferably in the range of not less than 1 mm to not more than 5 mm, and more preferably 2 mm to 4 mm. By the corner radius Rcp being 1 mm or more, partial increase of the film thickness due to the flow of the packaging material 10 during forming can be avoided, and sticking in the clearance Q can be better inhibited. By the corner radius Rcp being 5 mm or less, deformation of the corner shape can be better inhibited when the electrode member is inserted and vacuum sealed.

[Step S23]

After step S22, the punching die 26 is pushed into the opening 28 (refer to FIG. 4C) to form the recess 22 in the packaging material 10, thereby providing the embossed packaging material 20. The push-in (forming) temperature when pushing is in the range of about −10 to 50° C. (cold forming), the push-in speed is in the range of about 0.1 to 30 mm/second, and the push-in holding time is in the range of about 0 to 10 seconds. A push-in (forming) depth P is not specifically limited but can be set to 8 mm or more, or may be 10 mm or more, owing to the packaging material 10 having a good formability. Further, from the viewpoint of inhibiting the generation of pinholes due to the thinning of the metal foil layer 13, the push-in (forming) depth P is preferably 16 mm or less.

The embossed packaging material 20 produced in this manner, as stated above, has the recess 22 being displaced to one side when the upper surface is divided in halves along a line perpendicular to the long side (longitudinal direction). The packaging material 10 of the embodiment has good formability, and thus, the embossed packaging material 20 can be obtained without the occurrence of breakage, and the like even in the case of a single-sided formed battery which forms a deep recess 22 on only one side.

The punching die 26 is pushed into the opening 28 of the die 27 via the clearance Q (refer to FIG. 4C). The clearance Q is a minimum spacing between the punching die 26 and the die 27 when the punching die 26 has been pushed in the opening 28 of the die 27. The clearance Q is preferably 1 to 1.5 times the thickness of the packaging material 10, and more preferably 1.1 to 1.4 times the thickness. By the die clearance Q being 1 time or more the thickness of the packaging material 10, the sticking of the packaging material 10 in the die clearance Q can be better inhibited. Further, by the die clearance Q being 1.5 times or less the thickness of the packaging material 10, wrinkling of the formed area 22 side surface can be better inhibited by the effect of ironing.

(Electrical Storage Device 30)

Next, an electrical storage device 30 according to the embodiment will be described. The electrical storage device 30 can be obtained using the aforementioned packaging material 10 for electrical storage devices. The electrical storage device 30 is provided with electrical storage device elements and a container which accommodates the electrical storage device elements, and the container is formed from the packaging material 10. The container is preferably formed from the embossed packaging material 20 having a recess, and the electrical storage device elements are arranged in the recess. The electrical storage device elements include battery elements, such as a positive electrode, a separator, a negative electrode, electrolytic solution, etc. It is considered that the energy capacity of the electrical storage device 30 depends on the amount of accommodation of the electrical storage device elements, i.e., the amount of forming processing of the packaging material 10, and thus the greater the forming depth is, the more the energy capacity may increase.

When the container in the electrical storage device 30 according to the embodiment is formed from the embossed packaging material 20, the embossed packaging material 20 has a recess on one or both sides when divided in halves along a line perpendicular to the long side (longitudinal direction), and the forming depth of at least one of the recesses is preferably 8 mm or more. By the forming depth of at least one of the recesses being 8 mm or more, a satisfactory energy capacity is likely to be obtained. When there is a recess on both sides when the embossed packaging material 20 is divided in halves along a line perpendicular to the long side, the total of the forming depths of both of the recesses is preferably 16 mm or less. By the total of the forming depths of both of the recesses being 16 mm or less, pinholes are unlikely to be caused due to the thinning of the metal foil layer 13. If pinholes occur, there is a risk that moisture will infiltrate from outside, thus, the battery performance deteriorates.

(Production Method of the Electrical Storage Device)

Figure 6A:
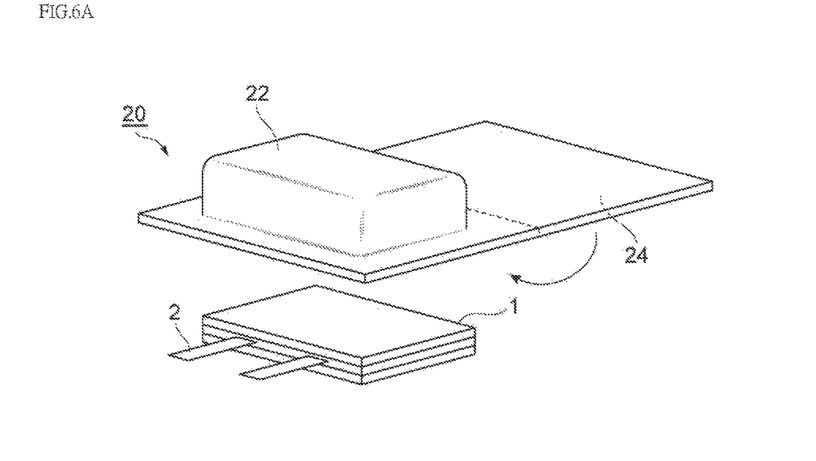
FIG. 6A illustrates a state in which the embossed-processed packaging material and the battery elements are prepared.
Figure 6B:
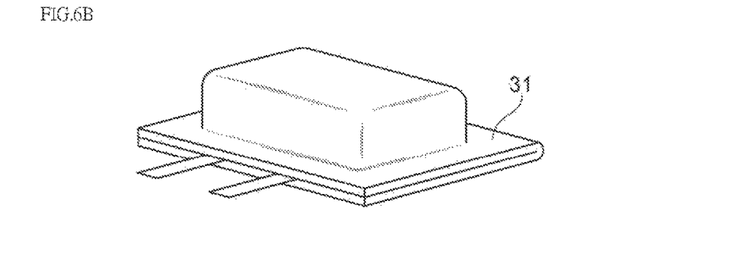
FIG. 6B illustrates a state in which a portion of the packaging material is folded and the end portions are heat-sealed.
Figure 6C:
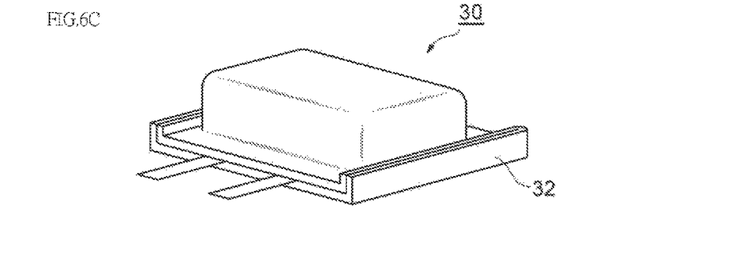
FIG. 6C illustrates a state in which both sides of the folded portion are folded upwards.

Next, with reference to FIGS. 6A-6C, a method for producing the electrical storage device 30 using the embossed packaging material 20 will be described. FIGS. 6A-6C are a set of perspective views each illustrating a step of producing a single-sided formed battery, using the embossed packaging material 20 (the packaging material 10 for electrical storage device). Note that, a double-sided formed battery may be produced by providing two packaging materials such as the embossed packaging materials 20, and adjusting the alignment when bonding such packaging materials to each other.

The electrical storage device 30 which is a single-sided formed battery can be produced by the following steps S31-S33.

Step S31: Step of arranging electrical storage device elements in the recess 22 of the embossed packaging material 20, and folding and overlapping surfaces of the embossed packaging material 20 so that the lid portion 24 covers the recess 22.

Step S32: Step of pressure heat-sealing the end parts, etc., of the folded and overlapped portions of the embossed packaging material 20 to seal the entire circumference of the embossed packaging material 20.

The production method of the electrical storage devices will be described by way of an example of a secondary battery. The secondary battery is produced, for example, by the following steps S31a-S33a. FIGS. 6A-6C show perspective views of steps of producing a single-sided formed battery which uses the embossed packaging material 20 (the packaging material 10 for electrical storage devices) according to the embodiment.

Step S31a: Step of arranging a battery element 1 in the formed area (recess 22) of the embossed packaging material 20, folding and overlapping surfaces of the embossed packaging material 20, and pressure heat-sealing one side of the embossed packaging material 20 so as to sandwich leads 2 which extend from the battery element 1 (refer to FIG. 6A and FIG. 6B).

Step S32a: Step of pressure heat-sealing sides, while leaving the one side which sandwiches the leads 2 unsealed, and then charging the electrolytic solution from the one side left unsealed, followed by pressure heat-sealing the one side left unsealed under vacuum conditions (refer to FIG. 6B).

Step S33a: Step of cutting a pressure heat-sealed side end parts other than the side which sandwiches the leads 2, followed by bending towards the formed area (recess 22) side (refer to FIG. 6C).

[Step S31a]

The battery element 1 configured of a positive electrode, a separator, a negative electrode, an electrolytic solution, and the like is arranged in the formed area 22 of the embossed packaging material 20, and the leads 2 extended from the battery elements 1 and connected respectively to the positive electrode and the negative electrode are drawn out of the formed area 22. Then, the embossed packaging material 20 is folded at the approximate center of the longitudinal direction to overlap the surfaces of the sealant layer 16 with each other, followed by pressure heat-sealing the side of the embossed packaging material 20 holding the leads 2. The pressure heat-sealing can be controlled by three conditions of temperature, pressure and time, and these conditions are set appropriately. The temperature of the pressure heat-sealing is preferably at least a temperature equal to or more than the temperature for melting the sealant layer 16.

[Step S32a]

Next, after performing pressure heat-sealing of sides, leaving one side holding the leads 2 unsealed, the electrolytic solution is charged from the one side left unsealed and the one side left unsealed is pressure heat-sealed under vacuum conditions. The conditions of the pressure heat-sealing are the same as in step S31a.

[Step S33a]

The pressure heat-sealed side end parts other than the side which sandwiches the lead 2 are cut and the sealant layer 16 which is pushed out from the end parts are removed. Then, pressure heat-sealed parts 31 are folded towards the formed area 22 side to form folded parts 32, thereby obtaining the secondary battery as the electrical storage device 30.

EXAMPLES

Hereinafter, the present invention will be specifically described by way of Examples, but the scope of the present invention should not be limited to these Examples.

[Materials Used]

The following are materials used in the following Examples and Comparative Examples to form the base layer 11, the adhesive layer 12, the metal foil layer 13, the corrosion prevention treatment layer 14, the adhesive layer 15 and the sealant layer 16 of the packaging material 10.

(Base Layer 11)

Base material A-1: Biaxially stretched nylon film (thickness: 25 μm)

Base material A-2: Biaxially stretched polyethylene terephthalate film (thickness: 25 μm)

Base material A-3: Biaxially stretched nylon film (thickness: 20 μm)

Base material A-4: Biaxially stretched nylon film (thickness: 50 μm)

Base material A-5: Biaxially stretched polyethylene terephthalate film (thickness: 20 μm)

Base material A-6: Biaxially stretched polyethylene terephthalate film (thickness: 50 μm)

Base material A-7: Non-stretched nylon film (thickness: 30 μm)

Base material A-8: Non-stretched polyethylene terephthalate film (thickness: 30 μm)

Base material A-9: Biaxially stretched nylon film (thickness: 15 μm)

Base material A-10: Biaxially stretched polyethylene terephthalate film (thickness: 16 μm)

(Adhesive Layer 12)

Adhesive B-1: Aromatic polyester urethane adhesive

Adhesive B-2: Aliphatic polyurethane adhesive (Metal Foil Layer 13)

Metal foil C-1: Aluminum foil with an iron content of 0.9 mass % (thickness: 40 μm)

Metal foil C-2: Aluminum foil with an iron content of 0.5 mass % (thickness: 40 μm)

Metal foil C-3: Aluminum foil with an iron content of 5.0 mass % (thickness: 40 μm)

Metal foil C-4: Aluminum foil with an iron content of 0.9 mass % (thickness: 30 μm)

Metal foil C-5: Aluminum foil with an iron content of 0.9 mass % (thickness: 60 μm)

Metal foil C-6: Aluminum foil with an iron content of 0.4 mass % (thickness: 40 μm)

Metal foil C-7: Aluminum foil with an iron content of 6.0 mass % (thickness: 40 μm)

Metal foil C-8: Aluminum foil with an iron content of 0.9 mass % (thickness: 25 μm)

(Corrosion Prevention Treatment Layer 14)

Treatment agent D-1: Coating-type treating agent for use in ceria sol treatment mainly containing cerium oxide, phosphoric acid and an acrylic resin.

(Adhesive Layer 15)

Adhesive resin E-1: Polypropylene resin graft-modified with maleic anhydride (commercial name "Adomer", manufactured by Mitsui Chemicals Inc.)

(Sealant Layer 16)

Film F-1: Non-stretched polypropylene film (thickness: 13 μm) having a corona-treated one surface.

Film F-2: Non-stretched polypropylene film (thickness: 40 μm) having a corona-treated one surface.

Film F-3: Non-stretched polypropylene film (thickness: 60 μm) having a corona-treated one surface.

[Preparation of the Packaging Material 10]

Example 1-1

The treatment agent D-1 was coated on one surface of the metal foil C-1, followed by drying to form the corrosion prevention treatment layer 14 on the metal foil layer 13. Next, the base A-1 was bonded to a surface of the metal foil layer 13 opposite to the surface on which the corrosion prevention treatment layer 14 was formed, by a dry lamination method using the adhesive B-1, so that the thickness of the adhesive layer 12 after lamination was 5 μm, followed by laminating the base layer 11 on the metal foil layer 13 via the adhesive layer 12. The obtained laminate was aged at 60° C. for 6 days. Next, the adhesive layer 15 was formed on the corrosion prevention treatment layer 14 side of the aged laminate by extruding the adhesive resin E-1 with an extruder so that the thickness after and forming the adhesive layer was 20 μm, followed by bonding the Film F-1 on the corrosion prevention treatment layer 14 via the adhesive layer 15 for sandwich lamination, thereby forming the sealant layer 16. After formation of the sealant layer 16, the laminate was thermally compressed under conditions of 190° C., 4 kg/cm$^2$, and 2 m/minute to prepare the packaging material 10. 0.3 mass % of aliphatic amide lubricant solution (lubricant solution (1)) was coated by gravure coating on the base layer side surface and the sealant layer side surface of the obtained packaging material, followed by drying. The coefficients of static friction of the base layer side surface and the sealant layer side surface were respectively 0.20 and 0.20. Tensile elongations measured for the obtained packaging material 10 were 70% in the MD direction and 75% in the TD direction.

Examples 1-2 to 1-16 and Comparative Examples 1-1 to 1-8

Except for changing the materials used and the thickness of the layer as indicated in Table 1 to form the base layer 11, the adhesive layer 12, the metal foil layer 13, the corrosion prevention treatment layer 14, the adhesive layer 15 and the sealant layer 16, the packaging materials 10 of Examples 1-2 to 1-16 and Comparative Examples 1-1 to 1-8 were prepared in the same manner as Example 1-1. The coefficient of static friction, the difference ($\mu_S-\mu_D$) between the coefficient of static friction $\mu_S$ and the coefficient of dynamic friction $\mu_D$, and the tensile elongation of the obtained packaging material 10 are shown together in Table 2. The details of the lubricants (2)-(3) in Table 1 are as follows.

Lubricant solution (2): 0.5 mass % aliphatic amide lubricant solution

Lubricant solution (3): 0.1 mass % aliphatic amide lubricant solution

[Evaluation of the Insulating Property]

The packaging materials 10 obtained in Examples 1-1 to 1-16 and Comparative Examples 1-1 to 1-8 were cut to a size of 120 mm×60 mm, and folded in half along a line perpendicular to the long side so that the sealant layer was on the inside. Next, both left and right edges including the edge end portions of the side of the folded portion were respectively heat sealed under conditions of 190° C./0.5 MPa/3 seconds to a width of 5 mm, and a bag-shaped packaging material was produced. After mixing ethylene carbonate/diethyl carbonate/dimethyl carbonate (1/1/1 (mass ratio)) as a solvent with LiPF$_6$ as an electrolyte, the mixed solution was charged into the bag-shaped packaging material from the open side, and the nickel tab leads each having a size 50 μm thickness, 12 mm width and 50 mm length were held at the opening, followed by heat sealing the packaging material and the tab leads together to a width of 10 mm under two conditions of 190° C./0.5 MPa/3 seconds and 200° C./0.5 MPa/3 seconds, thereby producing electric insulation evaluation samples. An insulation resistance tester (AC/DC withstanding voltage manufactured by Kikusui Electronics Corporation) electrodes were contacted to the tab leads and the metal foil layer of the packaging material of the electric insulation evaluation samples, followed by applying a 25V voltage for 5 seconds, and measuring the resistance of the electric insulation evaluation samples obtained under each heat sealing condition. The electrical insulating property was evaluated according to the following criteria. The evaluation results are shown in Table 2.

a: The resistance of the samples obtained at heat sealing temperatures of 190° C. and 200° C. was 25 GΩ or more.

b: The resistance of the samples obtained at a heat sealing temperature of 190° C. was 25 GΩ or more, but the resistance of the samples obtained at a heat sealing temperature of 200° C. was less than 25 GΩ.

c: The resistance of the samples obtained at heat sealing temperatures of 190° C. and 200° C. was less than 25 GΩ.

TABLE 1

|  | Base layer 11 | Adhesive layer 12 | Metal foil layer 13 | Thickness of the adhesive layer 15 | Sealant layer 16 | Total thickness of adhesive layer 15 and sealant layer 16 | Lubricant Base layer side | Lubricant Sealant layer side |
|---|---|---|---|---|---|---|---|---|
| Ex. 1-1 | A-1 | B-1 | C-1 | 20 μm | F-2 | 60 μm | (1) | (1) |
| Ex. 1-2 | A-2 | B-1 | C-1 | 20 μm | F-2 | 60 μm | (1) | (1) |
| Ex. 1-3 | A-3 | B-1 | C-1 | 20 μm | F-2 | 60 μm | (1) | (1) |
| Ex. 1-4 | A-4 | B-1 | C-1 | 20 μm | F-2 | 60 μm | (1) | (1) |
| Ex. 1-5 | A-5 | B-1 | C-1 | 20 μm | F-2 | 60 μm | (1) | (1) |
| Ex. 1-6 | A-6 | B-1 | C-1 | 20 μm | F-2 | 60 μm | (1) | (1) |
| Ex. 1-7 | A-1 | B-1 | C-2 | 20 μm | F-2 | 60 μm | (1) | (1) |
| Ex. 1-8 | A-1 | B-1 | C-3 | 20 μm | F-2 | 60 μm | (1) | (1) |
| Ex. 1-9 | A-1 | B-1 | C-4 | 20 μm | F-2 | 60 μm | (1) | (1) |
| Ex. 1-10 | A-1 | B-1 | C-5 | 20 μm | F-2 | 60 μm | (1) | (1) |
| Ex. 1-11 | A-1 | B-1 | C-1 | 12 μm | F-1 | 25 μm | (1) | (1) |
| Ex. 1-12 | A-1 | B-1 | C-1 | 30 μm | F-3 | 90 μm | (1) | (1) |
| Ex. 1-13 | A-1 | B-1 | C-1 | 20 μm | F-2 | 60 μm | (2) | (1) |
| Ex. 1-14 | A-1 | B-1 | C-1 | 20 μm | F-2 | 60 μm | (1) | (2) |
| Ex. 1-15 | A-1 | B-1 | C-1 | 20 μm | F-2 | 60 μm | (3) | (1) |
| Ex. 1-16 | A-1 | B-1 | C-1 | 20 μm | F-2 | 60 μm | (1) | (3) |
| Comp. ex. 1-1 | A-7 | B-1 | C-1 | 20 μm | F-2 | 60 μm | (1) | (1) |
| Comp. ex. 1-2 | A-8 | B-1 | C-1 | 20 μm | F-2 | 60 μm | (1) | (1) |
| Comp. ex. 1-3 | A-9 | B-1 | C-1 | 20 μm | F-2 | 60 μm | (1) | (1) |
| Comp. ex. 1-4 | A-10 | B-1 | C-1 | 20 μm | F-2 | 60 μm | (1) | (1) |
| Comp. ex. 1-5 | A-1 | B-2 | C-1 | 20 μm | F-2 | 60 μm | (1) | (1) |
| Comp. ex. 1-6 | A-1 | B-1 | C-6 | 20 μm | F-2 | 60 μm | (1) | (1) |
| Comp. ex. 1-7 | A-1 | B-1 | C-7 | 20 μm | F-2 | 60 μm | (1) | (1) |
| Comp. ex. 1-8 | A-1 | B-1 | C-8 | 20 μm | F-2 | 60 μm | (1) | (1) |

TABLE 2

| | Coefficient of static friction | | $\mu_S - \mu_D$ | | Outer casing tensile elongation | | |
|---|---|---|---|---|---|---|---|
| | Base layer side | Sealant layer side | Base layer side | Sealant layer side | MD direction | TD direction | Insulating property |
| Ex. 1-1 | 0.20 | 0.20 | 0.05 | 0.05 | 70% | 75% | a |
| Ex. 1-2 | 0.20 | 0.20 | 0.05 | 0.05 | 65% | 66% | a |
| Ex. 1-3 | 0.20 | 0.20 | 0.05 | 0.05 | 58% | 57% | a |
| Ex. 1-4 | 0.20 | 0.20 | 0.05 | 0.05 | 75% | 73% | a |
| Ex. 1-5 | 0.20 | 0.20 | 0.05 | 0.05 | 50% | 53% | a |
| Ex. 1-6 | 0.20 | 0.20 | 0.05 | 0.05 | 70% | 68% | a |
| Ex. 1-7 | 0.20 | 0.20 | 0.05 | 0.05 | 51% | 52% | a |
| Ex. 1-8 | 0.20 | 0.20 | 0.05 | 0.05 | 52% | 50% | a |
| Ex. 1-9 | 0.20 | 0.20 | 0.05 | 0.05 | 51% | 53% | a |
| Ex. 1-10 | 0.20 | 0.20 | 0.05 | 0.05 | 70% | 73% | a |
| Ex. 1-11 | 0.20 | 0.20 | 0.05 | 0.05 | 68% | 66% | b |
| Ex. 1-12 | 0.20 | 0.20 | 0.05 | 0.05 | 72% | 74% | a |
| Ex. 1-13 | 0.10 | 0.20 | 0.00 | 0.05 | 68% | 71% | a |
| Ex. 1-14 | 0.20 | 0.10 | 0.05 | 0.00 | 70% | 71% | a |
| Ex. 1-15 | 0.40 | 0.20 | 0.12 | 0.05 | 73% | 70% | a |
| Ex. 1-16 | 0.20 | 0.40 | 0.05 | 0.12 | 71% | 69% | a |
| Comp. ex. 1-1 | 0.20 | 0.20 | 0.05 | 0.05 | 30% | 32% | a |
| Comp. ex. 1-2 | 0.20 | 0.20 | 0.05 | 0.05 | 32% | 28% | a |

TABLE 2-continued

| | Coefficient of static friction $\mu_S$-$\mu_D$ | | | | Outer casing tensile elongation | | |
|---|---|---|---|---|---|---|---|
| | Base layer side | Sealant layer side | Base layer side | Sealant layer side | MD direction | TD direction | Insulating property |
| Comp. ex. 1-3 | 0.20 | 0.20 | 0.05 | 0.05 | 50% | 49% | a |
| Comp. ex. 1-4 | 0.20 | 0.20 | 0.05 | 0.05 | 47% | 45% | a |
| Comp. ex. 1-5 | 0.20 | 0.20 | 0.05 | 0.05 | 47% | 49% | a |
| Comp. ex. 1-6 | 0.20 | 0.20 | 0.05 | 0.05 | 49% | 51% | a |
| Comp. ex. 1-7 | 0.20 | 0.20 | 0.05 | 0.05 | 35% | 37% | a |
| Comp. ex. 1-8 | 0.20 | 0.20 | 0.05 | 0.05 | 47% | 45% | a |

[Forming Apparatus 25]

The settings of the forming apparatus 25 used for preparing the embossed packaging material 20 are shown below.

(Formed Area 22)

Formed area G-1: An approximate square shape with the length of one side being 100 mm Formed area G-2: An approximate square shape with the length of one side being 80 mm (Die 27)

Die H-1: The die radius Rd was 3 mm
Die H-2: The die radius Rd was 1 mm
Die H-3: The die radius Rd was 0.9 mm
Die H-4: The die radius Rd was 0.5 mm
Die H-5: The die radius Rd was 5 mm (Punching Die 26)

Punching die I-1: The punch radius Rp was 3 mm and the corner radius Rcp was 3 mm
Punching die I-2: The punch radius Rp was 3 mm and the corner radius Rcp was 0.5 mm
Punching die I-3: The punch radius Rp was 0.5 mm and the corner radius Rcp was 3 mm
Punching die I-4: The punch radius Rp was 1 mm and the corner radius Rcp was 3 mm
Punching die I-5: The punch radius Rp was 5 mm and the corner radius Rcp was 3 mm
Punching die I-6: The punch radius Rp was 3 mm and the corner radius Rcp was 1 mm
Punching die I-7: The punch radius Rp was 3 mm and the corner radius Rcp was 5 mm
Punching die I-8: The punch radius Rp was 0.9 mm and the corner radius Rcp was 3 mm
Punching die I-9: The punch radius Rp was 3 mm and the corner radius Rcp was 0.9 mm (Die Clearance Q)

Die clearance J-1: 169 μm
Die clearance J-2: 117 μm
Die clearance J-3: 1 times the thickness of the packaging material
Die clearance J-4: 1.5 times the thickness of the packaging material
Die clearance J-5: 0.9 times the thickness of the packaging material

[Preparation of the Embossed Packaging Material 20]

Examples 2-1

The packaging material 10 obtained in Example 1-1 was cut to a 210 mm×300 mm blank form, and arranged between the die 27 and the punching die 26 of the forming apparatus 25 which was set to the formed area G-1, the die H-1, the punching die I-1 and the die clearance J-1, so that the sealant layer 16 was the upper surface. Then, the packaging material 10 was fixed on the die 27 with the film presser 23 and the packaging material 10 was pressed by the punching die 26 to a predetermined depth and cold formed under the conditions of 23° C. and 50% RH to obtain the embossed packaging material 20.

Examples 2-2 to 2-32 and Comparative Examples 2-1 to 2-8

Except for changing the packaging material 10 and the settings of the forming apparatus 25 as indicated in Tables 3 and 4, the embossed packaging material 20 of Examples 2-2 to 2-32 and Comparative Examples 2-1 to 2-8 were prepared in the same manner as Example 2-1.

[Evaluation of Formability]

The formability of the embossed packaging material 20 obtained by setting a forming depth P to 3 to 17 mm every 0.5 mm in Examples 2-1 to 2-32 and Comparative Examples 2-1 to 2-8 was evaluated visually according to the following criteria. The evaluation results are shown in Table 3 and Table 4.

a: Deep drawing to a forming depth of 10 mm or more to 17 mm or less was possible without breakage or cracks.
b: Deep drawing to a forming depth of 8 mm or more to less than 10 mm was possible without breakage or cracks.
c: Deep drawing to a forming depth of less than 8 mm generated breakage or cracks.

TABLE 3

| | Packaging material | Formed area 22 | Die 27 | Punching die 26 | Die clearance Q | Evaluation result of formability |
|---|---|---|---|---|---|---|
| Ex. 2-1 | Ex. 1-1 | G-1 | H-1 | I-1 | J-1 | a |
| Ex. 2-2 | Ex. 1-2 | G-1 | H-1 | I-1 | J-1 | a |
| Ex. 2-3 | Ex. 1-3 | G-1 | H-1 | I-1 | J-1 | b |
| Ex. 2-4 | Ex. 1-4 | G-1 | H-1 | I-1 | J-1 | a |
| Ex. 2-5 | Ex. 1-5 | G-1 | H-1 | I-1 | J-1 | b |
| Ex. 2-6 | Ex. 1-6 | G-1 | H-1 | I-1 | J-1 | a |
| Ex. 2-7 | Ex. 1-7 | G-1 | H-1 | I-1 | J-1 | b |
| Ex. 2-8 | Ex. 1-8 | G-1 | H-1 | I-1 | J-1 | b |
| Ex. 2-9 | Ex. 1-9 | G-1 | H-1 | I-1 | J-1 | b |
| Ex. 2-10 | Ex. 1-10 | G-1 | H-1 | I-1 | J-1 | a |
| Ex. 2-11 | Ex. 1-11 | G-1 | H-1 | I-1 | J-1 | a |
| Ex. 2-12 | Ex. 1-12 | G-1 | H-1 | I-1 | J-1 | a |
| Ex. 2-13 | Ex. 1-13 | G-1 | H-1 | I-1 | J-1 | a |
| Ex. 2-14 | Ex. 1-14 | G-1 | H-1 | I-1 | J-1 | a |
| Ex. 2-15 | Ex. 1-15 | G-1 | H-1 | I-1 | J-1 | b |
| Ex. 2-16 | Ex. 1-16 | G-1 | H-1 | I-1 | J-1 | b |
| Ex. 2-17 | Ex. 1-1 | G-2 | H-1 | I-1 | J-1 | b |
| Ex. 2-18 | Ex. 1-1 | G-1 | H-1 | I-2 | J-1 | b |
| Ex. 2-19 | Ex. 1-1 | G-1 | H-4 | I-3 | J-1 | b |
| Ex. 2-20 | Ex. 1-1 | G-1 | H-2 | I-1 | J-1 | a |
| Ex. 2-21 | Ex. 1-1 | G-1 | H-5 | I-1 | J-1 | a |
| Ex. 2-22 | Ex. 1-1 | G-1 | H-1 | I-4 | J-1 | a |
| Ex. 2-23 | Ex. 1-1 | G-1 | H-1 | I-5 | J-1 | a |
| Ex. 2-24 | Ex. 1-1 | G-1 | H-1 | I-6 | J-1 | b |
| Ex. 2-25 | Ex. 1-1 | G-1 | H-1 | I-7 | J-1 | a |
| Ex. 2-26 | Ex. 1-1 | G-1 | H-1 | I-1 | J-2 | b |
| Ex. 2-27 | Ex. 1-1 | G-1 | H-1 | I-1 | J-3 | a |
| Ex. 2-28 | Ex. 1-1 | G-1 | H-1 | I-1 | J-4 | a |
| Ex. 2-29 | Ex. 1-1 | G-1 | H-3 | I-1 | J-1 | b |
| Ex. 2-30 | Ex. 1-1 | G-1 | H-1 | I-8 | J-1 | b |
| Ex. 2-31 | Ex. 1-1 | G-1 | H-1 | I-9 | J-1 | b |
| Ex. 2-32 | Ex. 1-1 | G-1 | H-1 | I-1 | J-5 | b |

TABLE 4

| | Packaging material | Formed area 22 | Die 27 | Punching die 26 | Die clearance Q | Evaluation result of formability |
|---|---|---|---|---|---|---|
| Comp. ex. 2-1 | Comp. ex. 1-1 | G-1 | H-1 | I-1 | J-1 | c |
| Comp. ex. 2-2 | Comp. ex. 1-2 | G-1 | H-1 | I-1 | J-1 | c |
| Comp. ex. 2-3 | Comp. ex. 1-3 | G-1 | H-1 | I-1 | J-1 | c |
| Comp. ex. 2-4 | Comp. ex. 1-4 | G-1 | H-1 | I-1 | J-1 | c |
| Comp. ex. 2-5 | Comp. ex. 1-5 | G-1 | H-1 | I-1 | J-1 | c |
| Comp. ex. 2-6 | Comp. ex. 1-6 | G-1 | H-1 | I-1 | J-1 | c |
| Comp. ex. 2-7 | Comp. ex. 1-7 | G-1 | H-1 | I-1 | J-1 | c |
| Comp. ex. 2-8 | Comp. ex. 1-8 | G-1 | H-1 | I-1 | J-1 | c |

As shown in Tables 1-4, the packaging materials 10 obtained in Examples 1-1 to 1-16 had a tensile elongation in the MD direction and the TD direction of 50% or more, and the embossed packaging material 20 obtained in Examples 2-1 to 2-32 using these packaging materials 10 showed good formability. Specifically, Examples 2-1, 2-2, 2-4, 2-6, and 2-10 to 2-14 which used the packaging materials according to Examples 1-1, 1-2, 1-4, 1-6, and 1-10 to 1-14 could perform deep drawing at a forming depth 10 mm or more without breakage or cracks.

In Comparative Examples 2-3 and 2-4 which used the packaging materials obtained in Comparative Examples 1-3 and 1-4 in which the strength of the base layer decreased by the base layer being thin, the protection effect to the metal foil layer decreased, and compared to Examples 2-1 and 2-2, the formability was reduced, and breakage or cracks occurred by deep drawing at a forming depth of less than 8 mm.

In Examples 2-15 and 2-16 in which different lubricants were applied to the base layer side surface or the sealant layer side surface so that the coefficient of static friction was 0.4, the flow amount to the formed area 22 of the packaging material 10 during forming decreased, and while the formability was somewhat reduced compared with Example 2-1, deep drawing at a forming depth of less than 5 to 10 mm could be performed without breakage or cracks.

Example 2-17 in which the length of one side of the formed area was 80 mm was affected by the flow of the adjacent corner when the packaging material 10 flowed to each corner during forming, and while the formability was somewhat reduced compared with Example 2-1, deep drawing at a forming depth of less than 5 to 10 mm could be performed without breakage or cracks.

In Example 2-18 in which forming was performed using a die having a corner radius Rcp of 0.5 mm, partial increase of the film thickness due to the flow of the packaging material 10 during forming could not be avoided, and while sticking occurred within the clearance, and the formability was somewhat reduced compared to Example 2-1, deep drawing at a forming depth of less than 5 to 10 mm could be performed without breakage or cracks.

In Example 2-19 in which forming was performed using a die having a die radius Rd and a punch radius Rp of 0.5 mm, sticking occurred while the packaging material 10 flowed into the clearance during forming, and while the formability was somewhat reduced compared with Example 2-1, deep drawing at a forming depth of less than 5 to 10 mm could be performed without breakage or cracks.

In Example 2-26 in which forming was performed using the die having a die clearance of 117 μm, since the clearance was 90% relative to the total thickness of the packaging material, sticking occurred while the packaging material 10 flowed into the clearance during forming, and while the formability was somewhat reduced compared to Example 2-1, deep drawing at a forming depth of less than 5 to 10 mm could be performed without breakage or cracks.

In Comparative Examples 2-1 and 2-3 which used an unstretched nylon film in the base layer, the strength of the base layer was insufficient, the protection effect to the metal foil layer decreased, the tensile elongation of the packaging material 10 was below 50%, the formability was reduced, and breakage or cracks occurred at the forming depth of less than 5 mm.

In Comparative Example 2-5 which used an aliphatic urethane adhesive in the adhesive layer 12, the strength of the adhesive layer 12 was insufficient, the protection effect to the metal foil layer 13 decreased, the tensile elongation of the packaging material 10 was below 50%, the formability was reduced, and breakage or cracks occurred at the forming depth of less than 5 mm.

In Comparative Example 2-6 which used an aluminum foil having an iron content of 0.4 mass % as the metal foil layer 13, the extensibility of the aluminum foil was low, the formability was reduced, and breakage or cracks occurred at the forming depth of less than 5 mm.

In Comparative Example 2-8 which used an aluminum foil having a thickness of 25 μm as the metal foil layer 13, the duration of the packaging material 10 against the thinning due to stress during forming was insufficient, the formability was reduced, and breakage or cracks occurred at the forming depth of less than 5 mm.

[Evaluation of the Moisture Barrier Properties]

In Example 2-1, the embossed packaging material 20 obtained by setting the forming depth P to 8 mm, 10 mm, 16 mm, or 16.5 mm was folded in half along a line perpendicular to the long side. As a reference sample, the packaging material 10 prior to the forming processing obtained in Example 1-1 was also folded in half along a line perpendicular to the long side so that the sealant layer was on the inside. Next, both left and right edges including end portions of the side of the folded portion were respectively heat sealed under the conditions of 190° C./0.5 MPa/3 seconds to a width of 5 mm, and a bag-shaped packaging material was produced. 3 mg of the mixture of ethylene carbonate/dimethyl carbonate/diethyl carbonate at (1/1/1 (mass ratio)) having a moisture content of 20 ppm or less was charged into the bag-shaped packaging material from the open side. Next, the edge of the open side was heat sealed under the conditions of 190° C./0.5 MPa/3 seconds to a width of 5 mm to produce a moisture permeability measurement sample. The produced moisture permeability measurement sample was stored for 4 weeks in an environment at a temperature of 60° C. and a humidity of 90%. The moisture content in the stored mixture was measured with a Karl Fischer testing machine. Relative values of moisture contents of the embossed packaging materials processed at respective forming depths were calculated with reference to the moisture content of a reference sample (100%) which was not yet formed. The moisture barrier properties were evaluated in accordance with the following criteria. The evaluation results of the moisture barrier properties are shown in Table 5.

a: The moisture content was less than 110% of the moisture content of the reference sample.

b: The moisture content was 110% or more and less than 150% of the moisture content of the reference sample.

c: The moisture content was 150% or more of the moisture content of the reference sample.

TABLE 5

| Forming depth P | Moisture barrier properties |
|---|---|
| 8 mm | a |
| 10 mm | a |
| 16 mm | b |
| 16.5 mm | c |

From the results of Table 5, it was verified that the embossed packaging material obtained in Example 2-1 showed good moisture barrier properties even when formed to the forming depth of 16 mm.

REFERENCE SIGNS LIST

1 . . . battery elements
2 . . . lead
10 . . . packaging material (packaging material for electrical storage device)
11 . . . base layer
12 . . . adhesive layer
13 . . . metal foil layer
14 . . . corrosion prevention treatment layer
15 . . . adhesive layer
16 . . . sealant layer
20 . . . embossed packaging material
22 . . . formed area (recess)
24 . . . lid portion
25 . . . forming apparatus
26 . . . punching die
27 . . . die
28 . . . opening
30 . . . electrical storage device
P . . . forming depth
Q . . . forming clearance
Rcp . . . corner radius
Rd . . . die radius
Rp . . . punch radius

What is claimed is:

1. A packaging material for electrical storage devices comprising a base layer, a metal foil layer arranged on the base layer, and a sealant layer arranged on the metal foil layer, wherein:
   the base layer includes at least one of a stretched polyester resin layer and a stretched polyamide resin layer;
   the metal foil layer is an aluminum foil containing iron in a range of about 0.5 mass % or more to about 5.0 mass % or less; and
   the packaging material has a tensile elongation of about 50% or more in both an MD direction and a TD direction of the base layer, wherein:
   the packaging material further comprises a second adhesive layer arranged on the metal foil layer;
   the sealant layer is arranged on the metal foil layer via the second adhesive layer;
   the base layer has a thickness in a range of 20 μm or more to 50 μm or less;
   the metal foil layer has a thickness in a range of 30 μm or more to 60 μm or less; and
   a total thickness of the second adhesive layer and the sealant layer is in a range of 25 μm or more to 90 μm or less.

2. The packaging material for electrical storage devices of claim 1, wherein:
   the packaging material further comprises a first adhesive layer arranged on the base layer;
   the metal foil layer is arranged on the base layer via the first adhesive layer; and
   the first adhesive layer includes an aromatic polyurethane adhesive layer.

3. The packaging material for electrical storage devices of claim 1, wherein:
   at least one of a side surface of the base layer and a side surface of the sealant layer has a coefficient of static friction of 0.1 or more;
   the side surface of the base layer and the side surface of the sealant layer each have a coefficient of static friction of 0.4 or less; and
   a difference ($\mu_S-\mu_D$) between a coefficient of static friction $\mu_S$ and a coefficient of dynamic friction $\mu_D$ of the side surface of the base layer and the side surface of the sealant layer is 0.1 or less.

4. An electrical storage device which can be obtained using the packaging material for electrical storage devices of claim 1.

5. A method for producing an embossed packaging material, comprising the steps of:
   preparing a forming apparatus including a punching die and a die having an opening corresponding to the punching die;
   arranging the packaging material for electrical storage devices between the punching die and the die so that the packaging material for electrical storage devices according to claim 1 covers the opening; and
   pushing the punching die into the opening to form a recess in the packaging material for electrical storage devices, wherein:
   a punch radius Rp of the punching die and a die radius Rd of the die are each in a range of 1 mm or more to 5 mm or less;
   a corner radius Rcp of the punching die is in a range of 1 mm or more to 5 mm or less; and
   a clearance that is a smallest spacing between the punching die and the die is 1 to 1.5 times the thickness of the packaging material when the punching die is pushed into the opening of the die.

6. A method for producing an electrical storage device, comprising the steps of:
   arranging electrical storage device elements in the recess of the embossed packaging material obtained by the production method according to claim 5;
   folding and overlapping the embossed packaging material so as to cover the recess; and
   heat-sealing overlapped portions of the embossed packaging material.

* * * * *